US012230118B2

(12) United States Patent
Sripathy et al.

(10) Patent No.: US 12,230,118 B2
(45) Date of Patent: Feb. 18, 2025

(54) SYSTEMS AND METHODS FOR KEYBOX STATUS DETERMINATION

(71) Applicant: Carrier Corporation, Palm Beach Gardens, FL (US)

(72) Inventors: Parameshwar Sripathy, Hyderabad (IN); Ramesh Lingala, Hyderabad (IN); Lakshman Subramanian, Hyderabad (IN)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

(21) Appl. No.: 17/664,072

(22) Filed: May 19, 2022

(65) Prior Publication Data

US 2022/0406164 A1 Dec. 22, 2022

Related U.S. Application Data

(60) Provisional application No. 63/202,645, filed on Jun. 18, 2021.

(51) Int. Cl.
*G08B 21/24* (2006.01)

(52) U.S. Cl.
CPC .................................... *G08B 21/24* (2013.01)

(58) Field of Classification Search
CPC ...... G08B 21/24; G07C 9/28; G07C 9/00309; G07C 9/27; G07C 2009/00936; G07C 2209/63; G07C 9/00896
USPC ........................................................ 340/5.73
See application file for complete search history.

(56) References Cited

U.S. PATENT DOCUMENTS

| | | | | |
|---|---|---|---|---|
| 4,914,732 A * | 4/1990 | Henderson | G07C 9/00571 70/277 |
| 8,957,757 B1 | 2/2015 | Le Burge et al. | |
| 2005/0206499 A1 | 9/2005 | Fisher | |
| 2005/0207087 A1 * | 9/2005 | Fisher | G07C 9/0069 361/160 |
| 2007/0090921 A1 * | 4/2007 | Fisher | G07C 9/00896 340/5.5 |
| 2010/0176919 A1 | 7/2010 | Myers et al. | |
| 2017/0241165 A1 * | 8/2017 | McGinn | E05B 63/0065 |
| 2021/0182786 A1 * | 6/2021 | Estill | H04W 4/029 |

FOREIGN PATENT DOCUMENTS

WO 2009064689 A1 5/2009

* cited by examiner

*Primary Examiner* — Brian Wilson
(74) *Attorney, Agent, or Firm* — Seager, Tufte & Wickhem, LLP

(57) ABSTRACT

Systems and methods for keybox status determination are disclosed. In some embodiments, a system for determining a status of a keycontainer of a lockbox comprises one or more sensors configured to generate output signals related to the keycontainer. The system further comprises at least one processor operatively connected with the one or more sensors, and memory storing instructions executable by the at least one processor. The instructions when executed cause the system to: determine, using the output signals from the one or more sensors, a status of the keycontainer, the status indicating whether the keycontainer is released from the keybox; and send a status notification based on the determined status of the keycontainer.

20 Claims, 4 Drawing Sheets

SYSTEMS AND METHODS FOR KEYBOX STATUS DETERMINATION

CROSS REFERENCE TO A RELATED APPLICATION

The application claims the benefit of U.S. Provisional Application No. 63/202,645 filed Jun. 18, 2021, the contents of which are hereby incorporated in their entirety

BACKGROUND

The invention relates generally to keyboxes and, more specifically, to keybox status determination.

Some known access control systems used in real estate sales include electronic keyboxes. Generally, the keyboxes include a keycontainer that holds a key to the home to be shown. Real estate agents may unlock the keyboxes using access keys (e.g., Active Key, XpressKey, or other fob devices), or a mobile application on their mobile devices. The mobile application is used to authenticate the real estate agent. In some cases, after a successful authentication with the keybox, the keybox may fail to release the keycontainer. In other cases, when putting the keycontainer back in the keybox, it may fail to close properly.

BRIEF DESCRIPTION

Aspects of the disclosure relate to methods, apparatuses, and/or systems for keybox status determination.

In some embodiments, a system for determining a status of a keycontainer of a lockbox comprises one or more sensors configured to generate output signals related to the keycontainer. The system further comprises at least one processor operatively connected with the one or more sensors, and memory storing instructions executable by the at least one processor. The instructions when executed cause the system to: determine, using the output signals from the one or more sensors, a status of the keycontainer, the status indicating whether the keycontainer is released from the keybox; and send a status notification based on the determined status of the keycontainer.

In some embodiments, the instructions cause the system to initiate a service call responsive to determining that the keycontainer is not released.

In some embodiments, the one or more sensors include one or more of a magnetic sensor, a magnetic nob, or a spring mechanism.

In some embodiments, the status of the keycontainer indicates whether the keycontainer is correctly placed in the keybox.

In some embodiments, the instructions cause the system to detect a battery failure of the keybox. In some embodiments, the status of the keycontainer indicates the battery failure.

In some embodiments, the one or more sensors are configured to generate output signals related to a position of the keycontainer inside the keybox. In some embodiments, the instructions cause the system to determine the status of the keycontainer based on the position of the keycontainer inside the keybox.

In some embodiments, the one or more sensors are configured to generate output signals related to a location of a user device. In some embodiments, the instructions cause the system to determine the status of the keycontainer based on the location of a user device.

In some embodiments, a system for determining a status of a keycontainer of a lockbox comprises at least one processor, and memory storing instructions executable by the at least one processor. The instructions when executed cause the system to: receive authentication information from a user; send an unlock code to the keybox to release the keycontainer; receive input from the user indicating whether the keycontainer is released; determine a status of the keycontainer based on the user input; and generate a service call responsive to determining that the keycontainer is not released.

In some embodiments, a method for determining a status of a keycontainer of a lockbox is implemented a system comprising one or more sensors, at least one processor. The method comprises: generating output signals related to the keycontainer; determining, using the output signals, a status of the keycontainer, the status indicating whether the keycontainer is released from the keybox; and sending a status notification based on the determined status of the keycontainer.

In some embodiments, a non-transitory computer-readable storage medium is configured for storing program instructions. The program instructions are computer-executable to implement: generating output signals related to the keycontainer; determining, using the output signals, a status of the keycontainer, the status indicating whether the keycontainer is released from the keybox; and sending a status notification based on the determined status of the keycontainer.

Various other aspects, features, and advantages of the invention will be apparent through the detailed description of the invention and the drawings attached hereto. It is also to be understood that both the foregoing general description and the following detailed description are examples and not restrictive of the scope of the invention.

BRIEF DESCRIPTION OF THE DRAWINGS

The subject matter, which is regarded as the disclosure, is particularly pointed out and distinctly claimed in the claims at the conclusion of the specification. The following descriptions of the drawings should not be considered limiting in any way. With reference to the accompanying drawings, like elements are numbered alike:

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
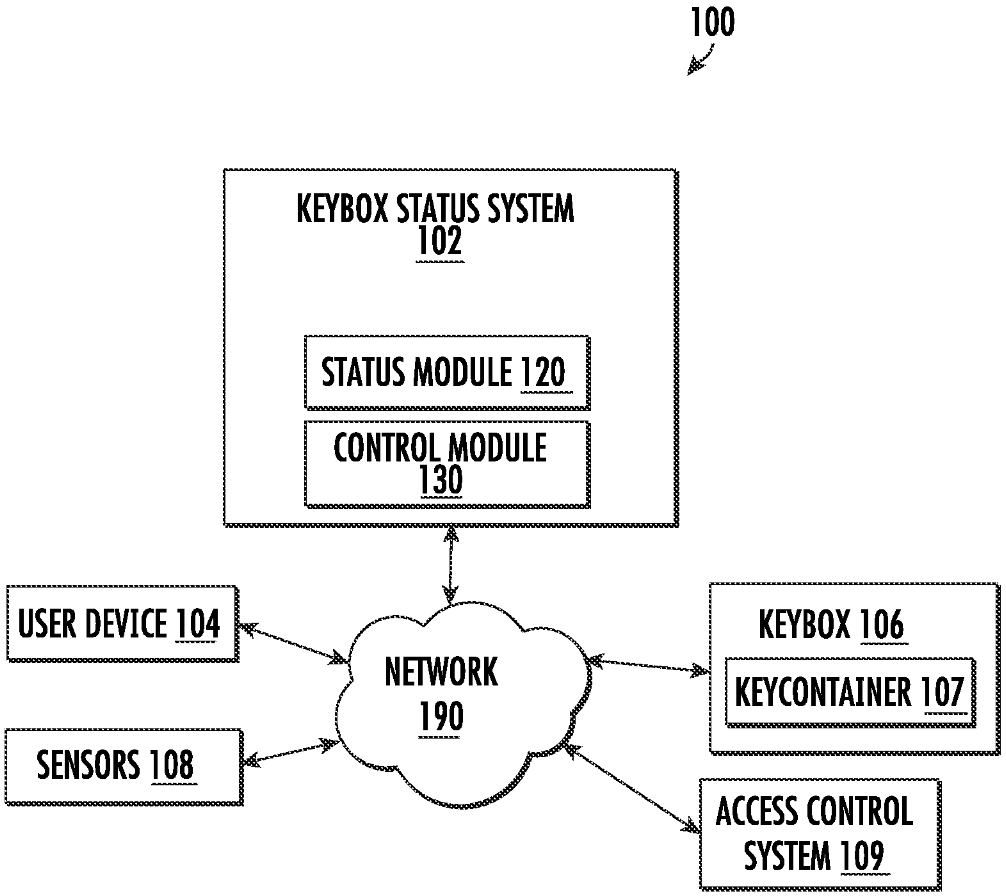
FIG. 1 shows an example of a system for keybox status determination, in accordance with one or more embodiments.

FIG. 1 shows an example of a system 100 for keybox status determination, in accordance with one or more embodiments. System 100, in some embodiments, may be configured to detect a keybox malfunction and generate a keybox status notification. In some embodiments, system 100 may be configured to generate a service call to attend to the keybox malfunction. One example application of the present disclosure is keyboxes used in real estate. Generally, electronic keyboxes (or lockboxes) are used to control access to real estate. An authorized agent might have access to the real estate (e.g., house) after authentication with the keybox (e.g., through a mobile app) and retrieving a key to the house from a keycontainer that is released from the keybox after authentication. In some cases, the keycontainer is not released from the keybox even after a successful authentication. In other cases, the keybox may fail to close properly when the agent tries putting the keycontainer back in the keybox (for example, once the listing showing is completed, the agent may put the key into keycontainer and closes it. In this process, the keycontainer may not close properly.) In other cases, access cards (e.g., RFID or magnetic cards) may cause the keycontainer to jam (e.g., if placed on the back side of the keycontainer). System 100 of the present disclosure may be configured to detect such malfunction of the keybox/keycontainer and provide a status of the keybox/keycontainer based on the detection. It is to be noted that the examples of causes for keybox/keycontainer malfunctions are not intended to be limiting. System 100 may be configured to detect the malfunction regardless of the cause.

In some embodiments, the keybox malfunction may be detected using one or more sensors located in the keybox, the keycontainer, the keycontainer pathway, the agent's mobile device, and/or other locations. In some embodiments, system 100 may be configured to notify the real estate agent (through the mobile app) that the keycontainer is jammed. Further, system 100 may notify the access control system and the homeowner. In some embodiments, system 100 may be configured to communicate with other data collection devices associated with the house (e.g., google home, Alexa, etc.), in these cases, the keybox may send different status updates to the data collection devices (e.g., the status updates may include battery status, or status of the keybox/keycontainer.) In some embodiments, system 100 may communicate with a user device of the agent through short-range wireless communication technologies (e.g., RFID, NFC, BLE/BTLE, Ultra-wideband (UWB), or other short-range communications technologies). In some embodiments, system 100 may use communication capabilities of the user device and/or the data collection devices (e.g., Wi-Fi or Cellular Network, or other communication networks) to communicate with the access control system.

In some embodiments, system 100 may be configured to generate a service call to auto-return the keybox and perform an un-attended install. In some embodiments, system 100 may provide an update to the real estate agent and/or owner. The update may include service schedule, new available showing times, ETA, etc. Operations of system 100 may provide for a faster and cheaper way to resolve issues with keyboxes without major changes to the hardware of the keyboxes, because the keyboxes may use the user device processing and communications capabilities to communicate with the access control system. That said, not all embodiments necessarily provide all of these benefits, and some embodiments may provide other distinct advantages, which is not to suggest that any other feature described herein may not also be omitted in some embodiments.

FIG. 1 shows an example of a system 100 for keybox status determination, in accordance with one or more embodiments. System 100 may include a keybox status system 102, a user device 104, a keybox 106, sensors 108, access control system 109, and/or other components. Other components known to one of ordinary skill in the art may be included in system 100 to gather, process, transmit, receive, acquire, and provide information used in conjunction with the disclosed embodiments. In addition, system 100 may further include other components that perform or assist in the performance of one or more processes that are consistent with disclosed embodiments.

Keybox 106 may be configured to control access to a space or an item. In this disclosure a keybox may refer to a keybox that is fixedly or removably secured to a portion of a structure. For example, a keybox containing keys to a house a building, a room, a storage unit a vehicle, and/or any access-controlled item or space. The keybox may be removably or fixedly secured to a structure such as, but not limited to, a wall, a shelf, an item of furniture, an appliance, a door, a post, a kiosk, a safe, and the like. Keybox 106 may be a container or include a container (e.g., keycontainer 107) containing one or more types of items that provide access to, and/or operation of, one or more access-controlled items and/spaces. For example, such a container could contain: keys, access cards, key fobs, etc. In some embodiments, keybox 106 may authenticate user device 104. In some embodiments, keybox 106 comprises a keycontainer 107 that holds a key to a home. Keybox 106, in these embodiments, is secured to or near the door of the home, e.g., by a shackle. Real estate agents generally use their mobile devices (e.g., user device 104) to interact with and communicate credentials to keybox 106. If these credentials are accepted, the keybox 106 opens, the keycontainer 107 is released allowing access to the key.

It is to be noted that, in some embodiments, keybox 106 may include an authentication program (or application) configured to authenticate the user (and/or user device 104) via multi-factor authentication, proximity authentication, passwords, exchange of keys, pairing, registration, forming a private link, or other forms of authentication. In some embodiments, keybox 106 may include computing capabilities including one or more processors, memory storage, control electronics, and/or other components that allow keybox 106 to gather, process, transmit, receive, acquire, and provide information used in conjunction with this disclosure.

Sensors 108 may be configured to generate output signals conveying information related to keybox 106, keycontainer 107, and/or mobile device 104. In some embodiments, sensors 180 may include one or more of a position sensor, a location sensor, a proximity sensor, an optical sensor, a global positioning system (GPS) sensor, a motion detector, a resistance sensor, a magnetic sensor, a spring mechanism, and/or other sensors. For example, in some embodiments, sensors 180 may include electric magnet nobs placed in the keycontainer pathway configured to provide information about the keycontainer placement and/or movement. In some embodiment, the one or more sensors may be configured to generate output signals that indicate whether keycontainer 107 is correctly placed in keybox 106 (as explained below, system 100 may be configured to detect when the keycontainer is placed incorrectly in the keybox and notify the agent, the access control system, the homeowner, etc.) In some embodiments, sensors 108 may be disposed in a plurality of locations within system 100. For example, sensors 108 may include sensors located in keybox 106, keycontainer 107, keycontainer pathway in the keybox, user device 104, with the user (e.g., the user is in possession of the sensor through a device or the sensor is directly coupled with the user), in the surrounding area of the user location (e.g., in a door, hallway, building, etc.), or in other locations.

User device 104 may include any device capable of communicating authentication credentials to keybox 106. In some embodiments, user device 104 may be configured to communicate with keybox 106 through short-range wireless communication technologies (e.g., RFID, NFC, BLE/BTLE, Ultra-wideband (UWB), or other short-range communications technologies). For example, user device 104 may be any user device having capabilities to communicate with the keybox (e.g., mobile phone, a wearable computing device, a tablet, etc.)

Keybox status system 102 may include a status module 120, a control module 130, and/or other components. Keybox status system 102 may include computing resources such as processors and memory devices for storing instructions (e.g., computing system 500 described herein below with reference to FIG. 5). The processors may be configured to execute software instructions to perform various operations of system 100. The computing resources may include software instructions to perform operations of modules 120, 130, and/or other components of system 100. It should be appreciated that although components 120 and 130 are illustrated in FIG. 1 as being co-located within a single processing unit, one or more of components 120, 130, and/or other components may be located remotely from the other components. The description of the functionality provided by the different components 120, 130, and/or other components described below is for illustrative purposes, and is not intended to be limiting, as any of components 120 and 130 may provide more or less functionality than is described. For example, one or more of components 120 and 130 may be eliminated, and some or all of its functionality may be provided by other components the other components 120 or 130. As another example, one or more additional components may perform some or all of the functionality attributed below to one of components 120 or 130.

Status module 120, may be configured to determine a status of keybox 106. In some embodiments, the status module 120 may indicate whether the keycontainer is released from the keybox (e.g., status may indicate that keycontainer 107 is released, or not released). In some embodiments, status module 120 may indicate the type of malfunction. For example, the status may indicate that the keycontainer is "jammed" inside the keybox; damaged, battery issues; lost communication; control electronics issue; or other types of malfunction. For example, in cases where a keybox is used in storage units, the keybox open/close mechanism inside the keybox may be damaged as a result of force lift of storage door. In some embodiments, the status may indicate whether the keycontainer 107 is correctly placed in keybox 106. For example, once a listing showing is completed, the agent may put the key into the keycontainer and place it incorrectly into the keybox. In this case, the keycontainer may be jammed in the keybox or the agent maybe unable to close the keybox. In these cases, the status of the keycontainer may indicate that the keycontainer is not correctly placed and/or that the keybox is jammed.

In some embodiments, status module 120 may determine that keycontainer 107 is not released (e.g., jammed) based on the user input (e.g., through an application on the user device 104). For example, system 100 may receive authentication information from the user (e.g., through the mobile app). After a successful authentication, the system may send an unlock code to keybox 106 (in some cases, the unlock code may be part of the authentication). In some embodiments, system 100 may receive input from the user indicating whether the keycontainer is released. For example, the user may indicate that the keycontainer is jammed by selecting an option on the mobile application (e.g., by selecting "keycontainer jammed" on the app) to indicate that the keycontainer was not released after the successful authentication with keybox 106. Status module 120 may be configured to determine the status of the keycontainer 107 based on the user input. It is to be noted that this example of user input is not intended to be limiting. Various ways of user input through the user device application may be considered and are consistent with the present disclosure. For example, the user may be prompted to answer one or more questions after successfully authenticating with keybox 106 to determine the status of keybox/keycontainer (e.g., "KEYCONTAINER RELEASED?", etc.)

In some embodiments, status module 120 may determine (or detect) a malfunction of one or more operations of the keybox 106 (or the keycontainer 107) based on output signals received from sensors 108. For example, status module 120 may detect a mechanical, electromechanical, battery, communication (e.g., network), or other issues related to the keybox 106 or the keycontainer 107 based on the output signals. In some embodiments, the output signals may indicate information related to the key container 107, keybox 106, user device 104, a key inside the keybox/keycontainer, or other sensor information. For example, in some embodiments, output signals received from electric magnet nobs placed in the keycontainer pathway may provide information about the keycontainer placement and/or movement inside the keybox. In some embodiments, the output signals may be related to a condition of a battery of the keybox. The status module 120 may be configured to determine the condition of the battery of the keybox. In some embodiments, the status of the keybox may indicate if there is a battery failure. For example, responsive to the keycontainer not being release (after authentication), the status may further indicate the battery failure. In some embodiments, status 120 may be configured to detect the battery failure and notify the access control system 109 (or the agent or homeowners).

In some embodiments, the output signals may indicate position information of one or more components of the keybox 106 (e.g., the keycontainer 107 position inside the keybox, a key position inside the keycontainer/keybox, or other position information). In some embodiments, the position information may indicate a position of one component of the lock box in relation to another component of the lockbox, or a general position information (e.g., coordinates). In some embodiments, status module 120 may be configured to determine the status of the keybox 106 (or keycontainer 107) based on the position information. In some embodiments, status module 120 may determine a change in position information. For example, status module 120 may determine an initial position of the keycontainer 107 before (or at the same time as) a release command to release the keycontainer from the keybox 106 and a subsequent position after the release command, and determine a status of the keycontainer (or keybox) based on the initial and subsequent position information. For example, status module 120 may be configured to determine that the keycontainer is released based on determining a difference between the initial position and the subsequent position. In some embodiments, the keycontainer 107 is determined to be released responsive to the difference (in position of the keycontainer) reaching a threshold position. For example, in some cases, the position of the keycontainer may change, but not enough for it to be released (does not reach the threshold position), in that case, the status module 120 may determine that the keycontainer is "jammed" inside the keybox or that there are other malfunctions as explained above. It is to be noted that the examples of position information described here are for illustrative purposes only, and are not intended to be limiting, as other position information may be used. For example, in some embodiments, sensors 108 may include a resistive sensor configured to generate output signals based on displacement of keycontainer 107.

In some embodiments, the output signals may indicate proximity information (e.g., proximity of user device 104 to keybox 106, to a building, or to another location). For example, the proximity information may indicate a distance between the user device 104 and the lockbox 106 (or the building, or other location). In some embodiments, status module 120 may be configured to determine the status of the keybox 106 (or keycontainer) based on the proximity information. For example, status module 120 may detect a change in the proximity information and determine that keycontainer is released. In some embodiments, keycontainer 107 may be determined to be released if the proximity change reaches (or around) a pre-determined value (e.g., 2 feet, 3 feet, or any pre-determined proximity change value). Similarly, the keycontainer may be determined to be "not released" (e.g., jammed, damaged, or other malfunction) if the proximity change is below the pre-determined value, or if there is no change. For example, status module 120 may determine that keybox 106 is malfunctioning if the proximity information between user device 104 and keybox 106 indicate that the user is still close to the keybox after authentication (which may indicate that the user couldn't get the key to access the home and move away from the keybox). In other examples, the status module 120 may determine that keybox 106 is malfunctioning if the proximity information between user device 104 and the home indicate that the user is not close to the home after authentication which may indicate that the user couldn't get the key to access the home.

In some embodiments, the status module 120 may determine the status of the keycontainer based on a combination of one or more factors (e.g., proximity, position, movements, time and/or other factors.) For example, the status of keycontainer 107 may be determined based on proximity information and time. In some embodiments, for example, status module 120 may determine a status of keycontainer 107 based on proximity change within a predetermined amount of time (e.g., 30, 60, 90 seconds or any pre-determined amount of time.) For example, if proximity between user device 104 and keybox 106 does not change (or is below a predetermined value) within 30 seconds, status module 120 may determine that keycontainer 107 is not released. Similarly, if there is a change in proximity between user device 104 and keybox 106 (e.g., above a predetermined value) within 30 seconds, status module 120 may determine that keycontainer 107 is released. It is to be noted that the examples of combination of factors for illustrative purposes only, and are not intended to be limiting, as other combinations of information obtained from sensors 108 may be used and are consistent with the present disclosure.

In some embodiments, the output signals received from sensors 108 may indicate location information of the user device 104. The location information, in some embodiments, may indicate the location of the user device in general (e.g., GPS coordinates), or location of the user device in relation to the keybox 106, or in relation to an access controlled space (e.g., a building, house, box, locker, etc.). For example, location of the user device 104 may indicate that the user device (or the user) is inside the house, in the garage, hallway, bedroom, backyard, etc.). In some embodiments, status module 120 may be configured to determine the status of the keybox 106 (or keycontainer 107) based on the location of user device 104. For example, status module 120 may determine that the keycontainer 107 is released in response to the location of the user device 104 (or user) indicating that the user device 104 is inside the house (which indicate that the key was successfully retrieved from the key container and the user was able to access the house). In some embodiments, status module 120 may determine that the keycontainer is not released based on the location of the user device 104 indicating that the user is not inside the house.

In some embodiments, status module 120 may use machine learning techniques to predict/determine the location of user device 104. For example, past location information of user device 104 (information from previous visits) may be input into a machine learning system to train one or more models to predict or determine the location of user device 104. The machine learning system may use one or more of supervised learning, semi-supervised, unsupervised learning, reinforcement learning, and/or other machine learning techniques. In some embodiments, the machine learning models may include linear regression, decision trees, support vector machines, regression analysis, Bayesian networks, random forest learning, dimensionality reduction algorithms, boosting algorithms, artificial neural networks (e.g., fully connected neural networks, deep convolutional neural networks, or recurrent neural networks), deep learning, and/or other machine learning models.

In some embodiments, status module 120 may send a request for confirmation of status to user device 104. For example, the request for confirmation may be sent based on the determination that keycontainer 107 is released or not released. In some embodiments, status module 120 may request a confirmation based on the received output signals from sensors 108 (e.g., position, location, proximity, or other information). For example, the request may be sent before a determination of status and based on the answer received, determine the status of keycontainer 107. The user may confirm the status by interacting with the mobile application. For example, the mobile application may include a message, a prompt, or a built-in function that allows the user to confirm the status (Examples of such messages may include: "KEY RELEASED?" "YES" or "NO"; "KEY JAMMED"; etc.)

Control module 130 may be configured to send a status notification based on the determined status of keycontainer 107. In some embodiments, the status notification may be sent to user device 104 or access control system 109. Access control system 109 is the system administrator for the keybox 106. In some embodiments, control module 130 may be configured send a request for service to access control system 109. The request for service may include a request for a service call (e.g., dispatch a technician to attend to the lockbox). In some embodiments, control access system 109 may be configured to schedule a technician visit in response to receiving a request for service from control module 130. Access control system 109 may be configured to send an update to control module 130, user device 104, or other devices. For example, the homeowner may be notified that keybox 106 is malfunctioning, that a technician is scheduled to visit, and the time of the visit. In some embodiments, control module 130 may be configured to update the lockbox status. For example, the lockbox status update may indicate the scheduled technician visit and offer new showing times.

Figure 2:
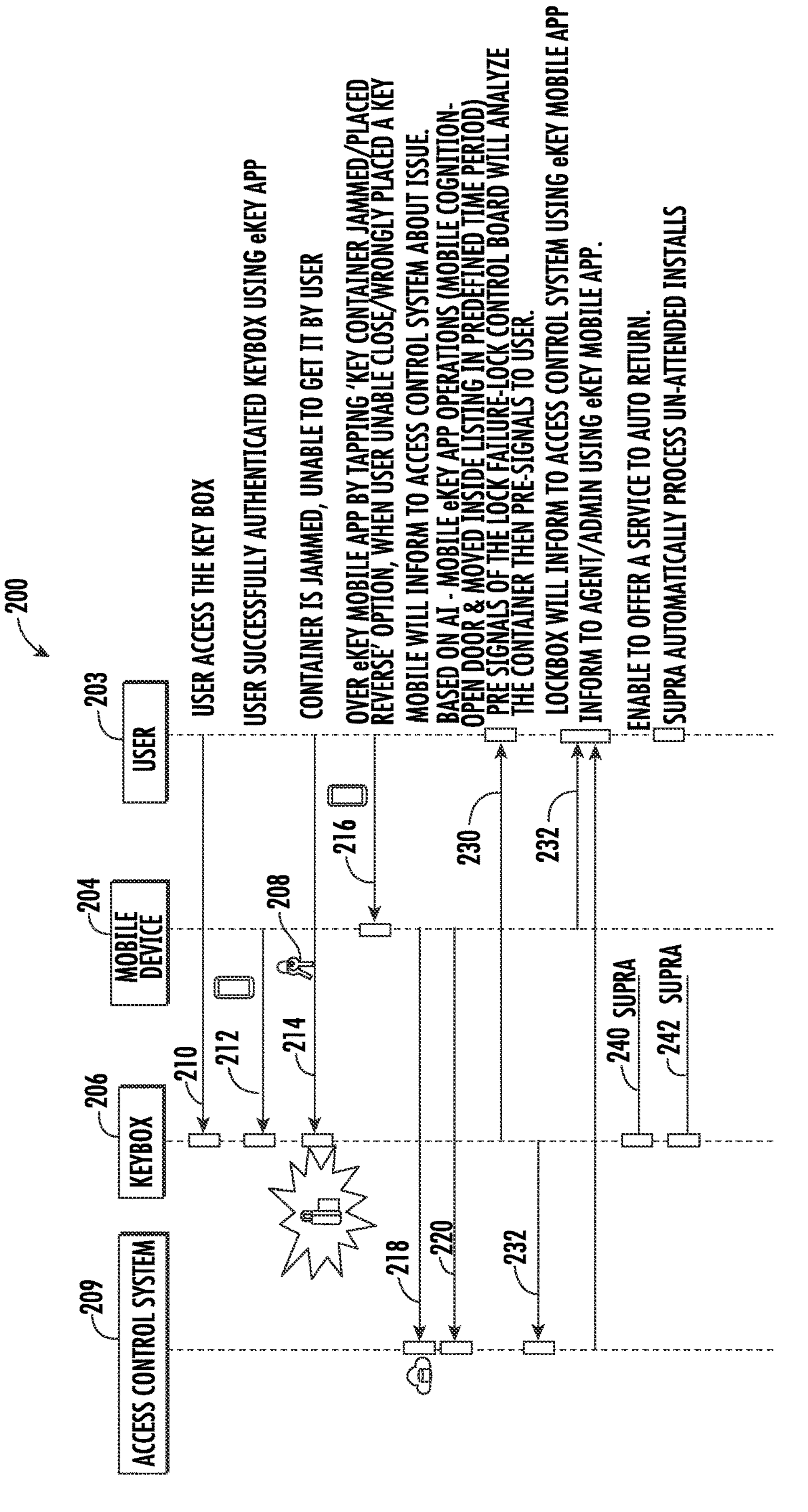
FIG. 2 shows an example of operations of keybox status determination system, according to one or more embodiments.

FIG. 2 illustrates an example diagram 200 of operation of a keybox status determination system, according to one or more embodiments. In some embodiments, at step 210 a user 203 may access keybox 206 (e.g., by opening the eKEY mobile application on mobile device 204). At step 212, the user is successfully authenticated by keybox 206 using eKEY app on mobile device 204. At step 214, the keycontainer is jammed and the user is unable to retrieve key 208. At step 216, the user uses the eKEY mobile app by tapping 'Key container jammed/placed reverse.' At step 218, mobile device 204 (through the eKEY app) notifies access control system 209 about the keycontainer malfunction. At step 240, a service to auto-return is generated based on the notification form lockbox 206 or mobile device 204. At step 242, an un-attended install may be scheduled. In some embodiments, the keybox status maybe updated to indicate a schedule for the service, new showing schedule, expected arrival time ETA, etc.

Alternatively, at step 220, the keybox status determination system may detect the keycontainer malfunction based on location and movement information of mobile device 204. For example, location or movement of the user device may indicate that user 203 is inside the house, in this case there is no issue with the keybox/keycontainer. However, if after a pre-determined amount of time (e.g., 30-90 sec), the location of mobile device 204 does not indicate that the user is inside the house, then the keybox status determination system may determine that there is an issue with the keybox/keycontainer. In some cases, keybox status determination system may request confirmation of the status from the user (e.g., through the eKEY app). At step 232, keybox 206 may notify, the user, access control system 209, and/or homeowner with the status of the keybox (e.g., jammed) using the eKEY mobile app. At step 240, a service to auto-return is generated based on the notification form lockbox 206 or mobile device 204. At step 242, an un-attended install may be scheduled. In some embodiments, the keybox status maybe updated to indicate a schedule for the service, new showing schedule, expected arrival time ETA, etc.

In some embodiments, the keybox status determination system may be configured to detect the malfunction (e.g., based on output signals from sensors inside the keybox 206 as explained above). In some embodiments, keybox 206 may be configured to communicate the status of the jammed box to the mobile device 204 (without the user having to indicate that the keycontainer is jammed). For example, the keybox may be configured to notify the user that the keycontainer is jammed, or that the key was wrongly placed in the keycontainer (e.g., user does not place the key properly in the keycontainer when returning it, and unable to close the keycontainer). In these embodiments, at step 230 keybox 206 notifies the user of the malfunction (e.g., through the eKEY app that the keycontainer can't close, jammed, etc.). At step 240, a service to auto-return is generated based on the notification form lockbox 206 or mobile device 204. At step 242, an un-attended install may be scheduled. In some embodiments, the keybox status maybe updated to indicate a schedule for the service, new showing schedule, expected arrival time ETA, etc.

In some embodiments, keybox 206 may be configured to communicate with other data collection devices associated with the house (e.g., google home, Alexa, etc.), in these cases, the keybox 206 may sent different status updates to the data collection devices. The status updates may include battery status, or status of the keybox/keycontainer. In some embodiments, keybox 206 may use network 190 (described below) for communicating with these devices. In some embodiments, an example of operations of system 100 may include remotely authenticating and accessing keybox 206. For example, in cases where a real estate agent is not physically present at the showing location but a buyer is present. The agent may access keybox 206 remotely for authentication and unlocking (to allow the buyer to visit the home). Communication with the keybox in these cases may be accomplished using the data collection devices or a buyer's user device (e.g., via a buyer's app). In some embodiments, keybox 206 may be configured to send a notification to the agent when the buyer visits the location (e.g., using the buyer's user device or the data collection devices of the home). In some embodiments, the agent may authenticate and unlock the keybox remotely (e.g., by communicating with the buyer's app on the mobile device and transferring credentials to the buyer's app which in turn authenticate with the keybox.) Once the authentication is complete, keybox 206 may be unlocked and the buyer may have access to the key. In some cases, the buyer may access the home and complete the visit (e.g., with assistance of a drone). In some embodiments, in case of keycontainer jamming, the buyer's app may be configured to communicate this information to the agent, owner, or access control system (in a manner similar to that of the agent's app communication with these entities).

Returning to FIG. 1, in some embodiments system 100 may include a network 190 connecting one or more components of system 100. In some embodiments, network 190 may be a dedicated communication link. In some embodiments, network 190 may be any type of network configured to provide communications between components of system 100. For example, network 190 may be any type of wired or wireless network (including infrastructure and any type of computer networking arrangement used to exchange data) that provides communications, exchanges information, and/or facilitates the exchange of information, such as the Internet, a private data network, a virtual private network using a public network, a Wi-Fi network, a LAN or WAN network, A frequency (RF) link, BLUETOOTH™, BLUETOOTH LE™ (BLE), Ultra-wideband (UWB), near field communication (NFC), optical code scanner, cellular network, Universal Serial Bus (USB), text messaging systems (e.g., SMS, MMS) or other suitable connections that enables the sending and receiving of information between the components of system 100.

It should be appreciated that the illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium.

Figure 3:
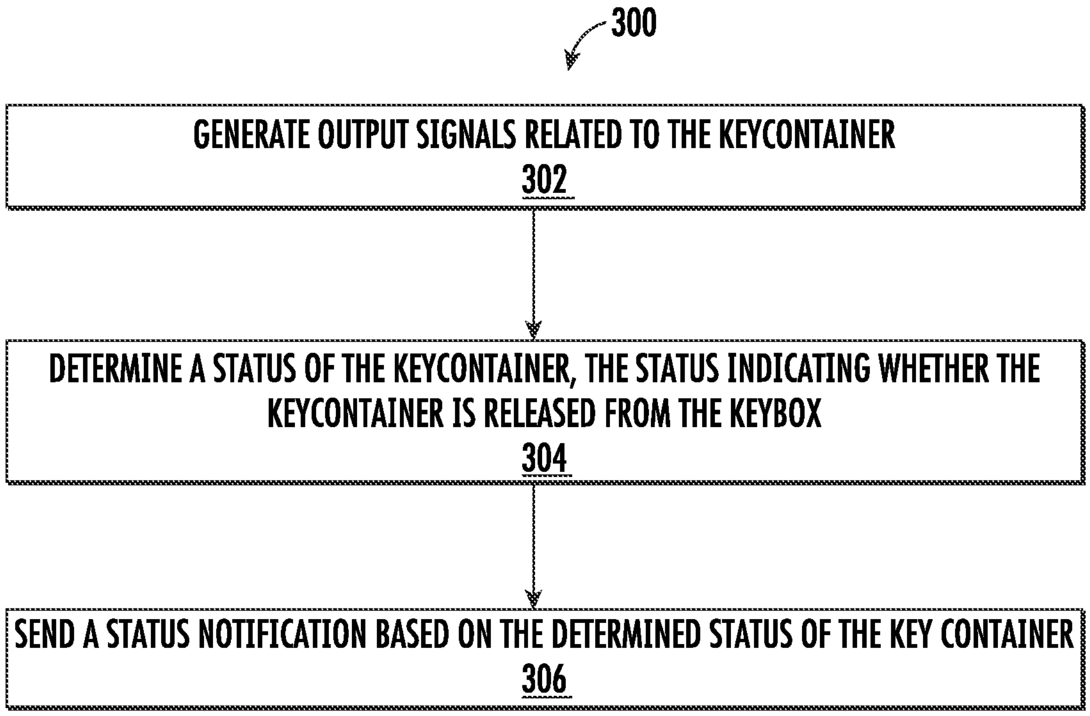
FIG. 3 shows a chart of a method for keybox status determination, in accordance with one or more embodiments.

FIG. 3 Illustrates a method 300 for contactless control of a physical device, in accordance with one or more embodiments of the present disclosure. The operations of method 300 presented below are intended to be illustrative. In some implementations, method 300 may be accomplished with one or more additional operations not described and/or without one or more of the operations discussed. Additionally, the order in which the operations of method 300 are illustrated in FIG. 3 and described below is not intended to be limiting In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the method.

At an operation 302 of method 300, output signals related to the keycontainer may be generated. In some embodiments, operation 302 may be performed by one or more sensors, the same as or similar to sensors 108 (shown in FIG. 1 and described herein).

At an operation 304 of method 300, a status of the keycontainer may be determined. In some embodiments, the status indicates whether the keycontainer is released from the keybox. In some embodiments, operation 304 may be performed by a status module, the same as or similar to status module 120 (shown in FIG. 1 and described herein).

At an operation 306 of method 300, a status notification based on the determined status of the keycontainer may be sent. In some embodiments, operation 306 may be performed by a control module, the same as or similar to control module 130 (shown in FIG. 1 and described herein).

Figure 4:
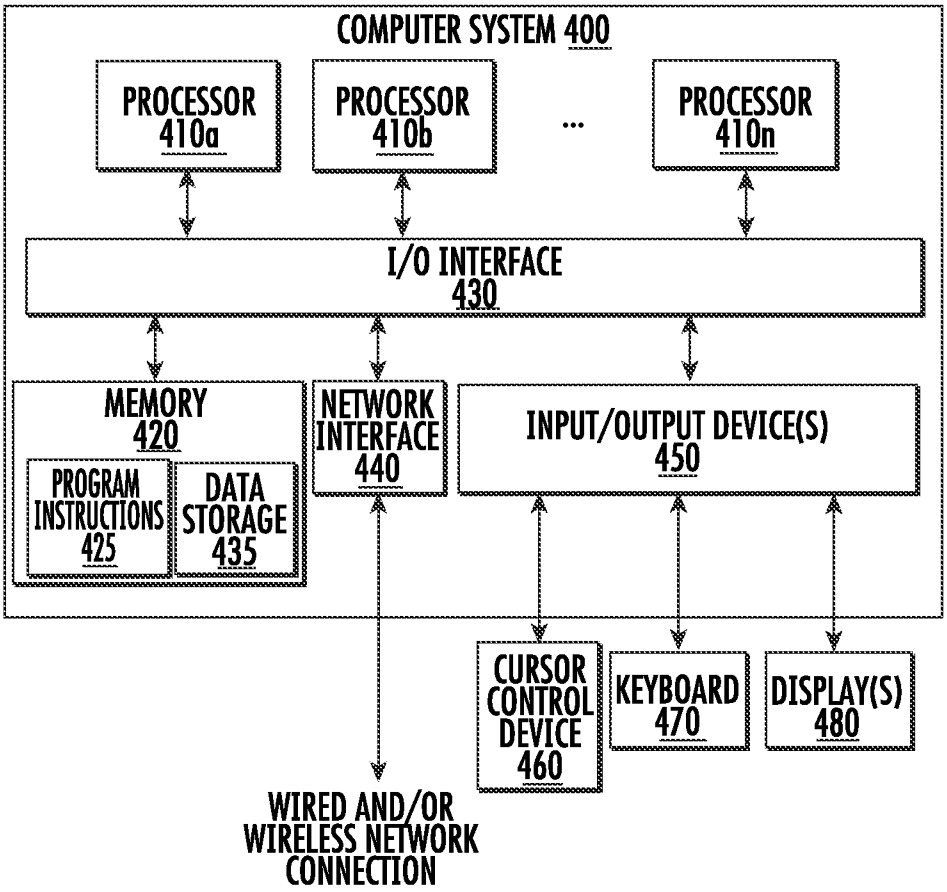
FIG. 4 shows an example of a computer system that may be used to implement aspects of the techniques described herein.

Embodiments of one or more techniques of contactless control of a physical device as described herein may be executed on one or more computer systems, which may interact with various other devices. One such computer system is illustrated by FIG. 4. FIG. 4 shows an example of a computer system that may be used to implement aspects of the techniques described herein. In different embodiments, computer system 400 may include any combination of hardware or software that can perform the indicated functions, including, but not limited to, a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or other type of computing or electronic device.

In the illustrated embodiment, computer system 400 includes one or more processors 410 coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In some embodiments, it is contemplated that embodiments may be implemented using a single instance of computer system 400, while in other embodiments multiple such systems, or multiple nodes making up computer system 400, may be configured to host different portions or instances of embodiments. For example, in one embodiment some elements may be implemented via one or more nodes of computer system 400 that are distinct from those nodes implementing other elements.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. may be comprised of semiconductor(s) and/or transistors (e.g., electronic integrated circuits (ICs)). In such a context, processor-executable instructions may be electronically executable instructions. For example, in various embodiments, processors 410 may be general-purpose or embedded processors implementing any of a variety of instruction set architectures (ISAs), such as the x86, PowerPC, SPARC, or MIPS ISAs, or any other suitable ISA. In multiprocessor systems, each of processors 410 may commonly, but not necessarily, implement the same ISA.

In some embodiments, at least one processor 410 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others. In some embodiments, one or more computers may include multiple processors operating in parallel. A processor may be a central processing unit (CPU) or a special-purpose computing device, such as graphical processing unit (GPU), an integrated circuit or on-chip system, an application-specific integrated circuit (ASIC), a field-programmable gate array (FPGA), a complex programmable logic device (CPLD), or application-specific integrated circuits.

System memory 420 may be configured to store program instructions and/or data accessible by processor 410. In various embodiments, system memory 420 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described in this disclosure, are shown stored within system memory 420 as program instructions 425 and data storage 435, respectively. In other embodiments, program instructions and/or data may be received, sent or stored upon different types of computer-accessible media or on similar media separate from system memory 420 or computer system 400. Generally speaking, a computer-accessible medium may include storage media or memory media such as magnetic or optical media, e.g., disk or CD/DVD-ROM coupled to computer system 400 via I/O interface 430. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 440.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. In addition, in some embodiments some or all of the functionality of I/O interface 430, such as an interface to system memory 420, may be incorporated directly into processor 410.

Network interface 440 may be configured to allow data to be exchanged between computer system 400 and other devices attached to a network, such as other computer systems, or between nodes of computer system 400. In various embodiments, network interface 440 may support communication via wired or wireless general data networks, such as any suitable type of Ethernet network, for example, via telecommunications/telephony networks such as analog voice networks or digital fiber communications networks; via storage area networks such as Fibre Channel SANs, or via any other suitable type of network and/or protocol.

Input/output devices 450 may, in some embodiments, include one or more display terminals, cursor control devices (e.g., mouse), keyboards, keypads, touchpads, touchscreens, scanning devices, voice or optical recognition devices, or any other devices suitable for entering or retrieving data by one or more computer system 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

Those skilled in the art will appreciate that computer system 400 is merely illustrative and is not intended to limit the scope of the present disclosure. In particular, computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for determining a status of a keycontainer of a lockbox, the system comprising:

one or more sensors configured to generate output signals related to the keycontainer, wherein the output signals comprising a position information of the keycontainer inside the lockbox relative to the lockbox; at least one processor operatively connected with the one or more sensors; and memory storing instructions executable by the at least one processor, the instructions when executed cause the system to:

determine, using the output signals from the one or more sensors, the status of the keycontainer, the status indicating whether the keycontainer is released from the lockbox and whether the keycontainer is placed correctly in the lockbox, wherein the determination is based on the position information of the keycontainer inside the lockbox relative to the lockbox; and send a status notification based on the determined status of the keycontainer.

2. The system of claim 1, wherein the instructions when executed cause the system to:

initiate a service call responsive to determining that the keycontainer is not released.

3. The system of claim 1, wherein the one or more sensors include one or more of a magnetic sensor, a magnetic nob, or a spring mechanism.

4. The system of claim 1, wherein the system is configured to detect, from the one or more sensors, that the keycontainer is placed incorrectly in the lockbox and generate a notification in response thereto.

5. The system of claim 1, wherein the instructions when executed cause the system to:

detect a battery failure of the lockbox, and wherein the status of the keycontainer indicates the battery failure.

6. The system of claim 1, wherein the one or more sensors are configured to generate the output signals related to a location of a user device, and wherein determining the status of the keycontainer is based on the location of the user device.

7. The system of claim 1, wherein the instructions when executed cause the system to:

receive authentication information from a user;

send an unlock code to the lockbox to release the keycontainer;

receive input from the user indicating whether the keycontainer is released;

determine the status of the keycontainer based on the user input; and generate a service call responsive to determining that the keycontainer is not released.

8. The system of claim 1, wherein the position information includes an initial location of the keycontainer relative to the lockbox before a release command to release the keycontainer from the lockbox and a subsequent position after the release command; and wherein the determination is also based on the difference between the initial and the subsequent position.

9. A method for determining a status of a keycontainer of a lockbox, the method being implemented in a system comprising one or more sensors, at least one processor, and memory storing instructions, the method comprising:

generating output signals related to the keycontainer, wherein the output signals comprise a position information of the keycontainer inside the lockbox relative to the lockbox;

determining, using the output signals, the status of the keycontainer, the status indicating whether the keycontainer is released from the lockbox, wherein determining the status of the keycontainer is based on the position information of the keycontainer inside the lockbox relative to the lockbox, and wherein the status further indicates whether the keycontainer is placed correctly in the lockbox or placed incorrectly in the lockbox; and sending a status notification based on the determined status of the keycontainer.

10. The method of claim 9, further comprising:

initiating a service call responsive to determining that the keycontainer is not released.

11. The method of claim 9, wherein the output signals are related to the position of the keycontainer inside the lockbox.

12. The method of claim 9, wherein the output signals are related to a location of a user device, and wherein determining the status of the keycontainer is based on the location of the user device.

13. The method of claim 9, wherein the output signals are received from the one or more sensors including one or more of a magnetic sensor, a magnetic nob, or a spring mechanism.

14. The method of claim 9, wherein the status of the keycontainer indicates the keycontainer is placed incorrectly in the lockbox responsive to one or more of the keycontainer being jammed in the lockbox and the lockbox failing to close properly.

15. The method of claim 9, further comprising:

receiving authentication information from a user;

sending an unlock code to the lockbox to release the keycontainer;

receiving input from the user indicating whether the keycontainer is released;

determining the status of the keycontainer based on the user input; and generating a service call responsive to determining that the keycontainer is not released.

16. A non-transitory computer-readable storage medium storing program instructions, wherein the program instructions are computer-executable to implement:

generating output signals related to a keycontainer, wherein the output signals comprise a position information of the keycontainer inside a lockbox relative to the lockbox;

determining, using the output signals, a status of the keycontainer, the status indicating whether the keycontainer is released from the lockbox, wherein determining the status of the keycontainer is based on the position information of the keycontainer inside the lockbox relative to the lockbox, and wherein the status further indicates whether the keycontainer is correctly placed in the lockbox or incorrectly placed in the lockbox; and sending a status notification based on the determined status of the keycontainer.

17. The non-transitory computer-readable storage medium of claim 16, wherein the program instructions are computer-executable to implement:

initiating a service call responsive to determining that the keycontainer is not released.

18. The non-transitory computer-readable storage medium of claim 16, wherein the output signals are related to the position of the keycontainer inside the lockbox.

19. The non-transitory computer-readable storage medium of claim 16, wherein the output signals are related to a location of a user device, and wherein determining the status of the keycontainer is based on the location of the user device.

20. The non-transitory computer-readable storage medium of claim 16, wherein the program instructions are computer-executable to implement:

receiving authentication information from a user;

sending an unlock code to the lockbox to release the keycontainer;

receiving input from the user indicating whether the keycontainer is released; and determining the status of the keycontainer based on the user input.

* * * * *